(12) United States Patent
Lewis et al.

(10) Patent No.: US 6,349,353 B1
(45) Date of Patent: *Feb. 19, 2002

(54) SYSTEM AND METHOD FOR DETECTING AND ROUTING BETWEEN AN OPTIONAL PLUG-IN CONTROLLER AND MULTIPLE FIXED PERIPHERAL BACKPLANES

(75) Inventors: Quentin J. Lewis, Litchfield; Steve Doherty, Chester, both of NH (US); Arthur H. Cianelli, Methuen, MA (US)

(73) Assignee: Sun Microsystems, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/075,025

(22) Filed: May 8, 1998

(51) Int. Cl.[7] .............................. G06F 3/00; G06F 13/00
(52) U.S. Cl. ...................... 710/101; 710/62; 710/126; 709/238; 711/111; 711/166
(58) Field of Search ............................... 710/62, 8, 10, 710/101, 126; 709/238, 242, 244, 301; 711/114, 166, 111

(56) References Cited

U.S. PATENT DOCUMENTS

| | | | | |
|---|---|---|---|---|
| 4,200,928 A | * | 4/1980 | Allan et al. ................. | 711/114 |
| 5,159,683 A | * | 10/1992 | Lvovsky et al. ............... | 710/9 |
| 5,467,453 A | * | 11/1995 | Kocis .......................... | 710/101 |
| 5,542,055 A | * | 7/1996 | Amini et al. ................ | 710/101 |
| 5,577,931 A | * | 11/1996 | Leshem ....................... | 439/497 |
| 5,657,455 A | * | 8/1997 | Gates et al. ................. | 710/100 |
| 5,745,795 A | * | 4/1998 | Pecone et al. ................ | 710/62 |
| 5,751,977 A | * | 5/1998 | Alexander ................... | 710/126 |
| 5,829,048 A | * | 10/1998 | Ofer et al. ................... | 711/166 |
| 5,838,892 A | * | 11/1998 | Wilson .......................... | 714/6 |
| 5,872,781 A | * | 2/1999 | Bennett et al. .............. | 370/365 |
| 5,875,063 A | * | 2/1999 | Corrington et al. ........... | 360/71 |
| 6,029,216 A | * | 2/2000 | Hoglund et al. ............ | 710/101 |

OTHER PUBLICATIONS

Philips—PCF8574 IC Data Sheet, Sep., 1994.*

* cited by examiner

Primary Examiner—Thomas Lee
Assistant Examiner—Tammara Peyton
(74) Attorney, Agent, or Firm—Blakely Sokoloff Taylor & Zafman

(57) ABSTRACT

A system and method for determining a routing of cables between devices within a computer chassis. The method comprises signaling, for each of the devices, deactivation of a selected signal line of each cable. Then, one of the devices is requested to activate its selected signal line for one of the cables. The selected signal line is coupled to an input/output (I/O) data port of a driver circuit associated with the devices. The voltage on the I/O data port is sensed to determine which device is coupled to and in control of other device(s).

24 Claims, 4 Drawing Sheets

SYSTEM AND METHOD FOR DETECTING AND ROUTING BETWEEN AN OPTIONAL PLUG-IN CONTROLLER AND MULTIPLE FIXED PERIPHERAL BACKPLANES

BACKGROUND

1. Field of the Invention

The present invention relates to the field of data communications. In particular, the present invention relates to a method and apparatus to ensure proper association between electronics in a computer system.

2. General Background

Over the last decade, computers have become an important product for both commercial and personal use, in part due to their versatility. For example, computers are commonly used as a vehicle to transfer information over private or public networks. "Private networks" include a local area network or any network having restricted access, while "public networks" include the Internet or any network allowing access to the public at large.

In general, a computer comprises a chassis which encloses a number of circuit boards, normally including at least two backplanes. A "backplane" is a circuit board including a plurality of connectors coupled together through a common bus. Each connector is capable of receiving a removable circuit board. Depending on the chosen computer architecture, backplanes may be situated proximate to each other or at opposite ends of the chassis.

In certain types of computers, one backplane may be arranged to receive one or more memory boards associated with a corresponding number of hard disk drives while another backplane is adapted to receive circuit boards to control the functionality of the hard disk drives (hereinafter referred to as "controller boards"). This is accomplished by installing one or more cables between the controller board and the memory board(s) associated with the hard disk drive(s). Each cable comprises a plurality of signal lines, normally covered by as protective sheath, to transfer information from a source to a destination.

When each cable includes standard, interchangeable connectors, it is possible that a cable may be installed incorrectly, especially when blind (or hidden) cable routing needed for the computer architecture. Cable routing errors may occur at manufacturer or when the end user upgrades his or her computer with additional controller boards in order to support additional hard disk drives. For example, when installing additional or upgraded disk drives, a cable may be connected to the wrong controller board.

It is contemplated that cable routing errors may not be detected when they are not disruptive to the operations of the computer. However, in the event of a faulty hard disk drives, a cable routing error would cause the wrong disk drive to be identified as the malfunctioning drive. The reason is that error identification to the end user is based the physical placement of the hard disk drive in the chassis (or the disk drive number), not its true placement through cabling. While this problem may be overcome by customizing various cables and their mating connectors to lessen the chances of a cabling error, this solution is not cost effective.

SUMMARY

Briefly, in one embodiment, the present invention relates to a method for determining a routing of cables between devices within a computer chassis. The method is comprised of signaling, for each of the devices, deactivation of a selected signal line of each cable. Then, one of the devices is requested to activate its selected signal line for one of the cables. The selected signal line is coupled to an input/output (I/O) data port of a driver circuit associated with the devices. The voltage on the I/O data port is sensed to determine which device is coupled to and in control of other device(s).

BRIEF DESCRIPTION OF THE DRAWINGS

The features and advantages of the present invention will become apparent from the following detailed description in which.

DESCRIPTION OF AN EMBODIMENT OF THE PRESENT INVENTION

An illustrative embodiment of the present invention is set forth to describe a method and apparatus for ensuring proper association between a removable, small computer standard interface (SCSI) controllers and various stationary logic devices. While specific circuitry has been set forth, it is obvious that these specific details are not required to practice the invention. Likewise, well known circuits, devices and the like may not be discussed in detail in order to avoid obscuring the present invention.

In the detailed description, various terms are frequently used to describe certain characteristics or qualities. For example, "information" comprises data, address, control or any combination thereof. A "computer" includes any hardware having information processing capabilities such as, for example, a desktop computer, a portable computer, a server, a mainframe, or even an image production device (e.g., facsimile machine, scanner, or printer). A "peripheral device" includes an input/output (I/O) electronic device such as, for example, a hard disk drive, a floppy disk drive, and the like.

Figure 1:
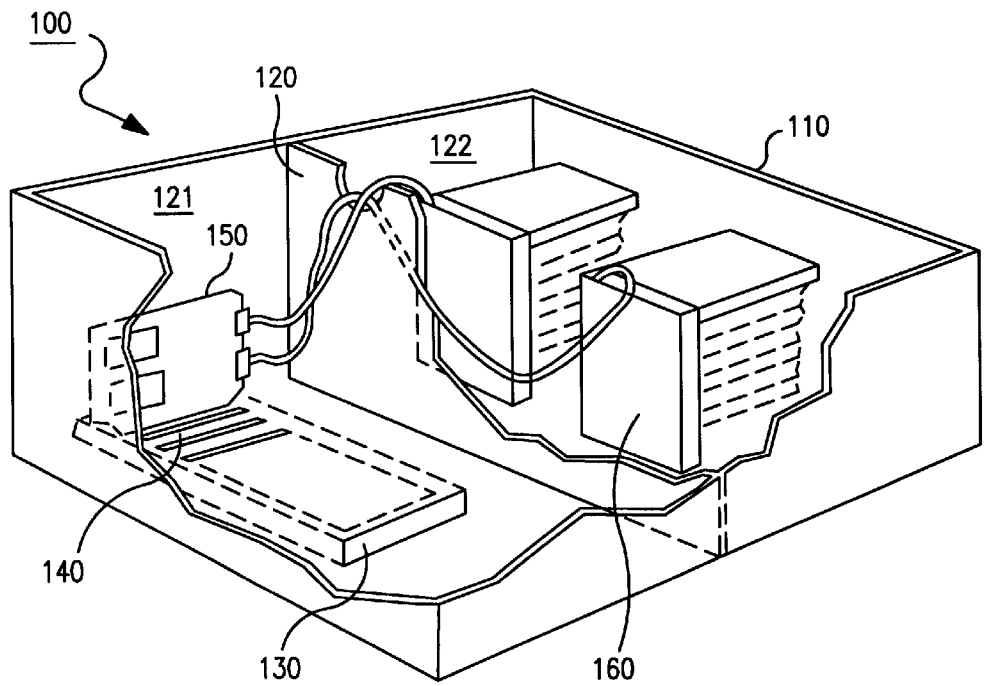
FIG. 1 is an illustrative prospective view of a computer implemented with the present invention.

Referring to FIG. 1, a perspective view of an illustrative embodiment of the computer 100 is shown. Computer 100 comprises a chassis 110 to enclose a plurality of circuit boards. Within chassis 110, a barrier 120 separates the interior into two compartments: (i) a first compartment 121 including a main backplane 130, and (ii) a second compartment 122 including one or more peripheral backplanes 160.

As shown in FIG. 1, main backplane 130 comprises one or more connectors 140, each coupled together through an internal bus (e.g., a Peripheral Component Interconnect "PCI" bus of FIG. 2) and adapted to receive a controller board 150. In this embodiment, one type of controller board 150 includes a small computer standard interface (SCSI) controller board 250 which is described in more detail in FIG. 3. Peripheral backplane 160 is capable of receiving a plurality of peripheral boards, each peripheral board associated with a selected peripheral device (e.g., hard disk drive). The hard disk drives are arranged on the chassis in a vertical alignment and at least one light emitting diode (LED) is situated to protrude from chassis 110 in close proximity with each of these hard disk drives. The LEDs allow the end user to visually determine which hard disk drive is being accessed, initialized or signaled as faulty. Of course, in lieu of a backplane architecture, the peripheral devices may be serially coupled together through ribbon cable or any other type of communication link.

Figure 2:
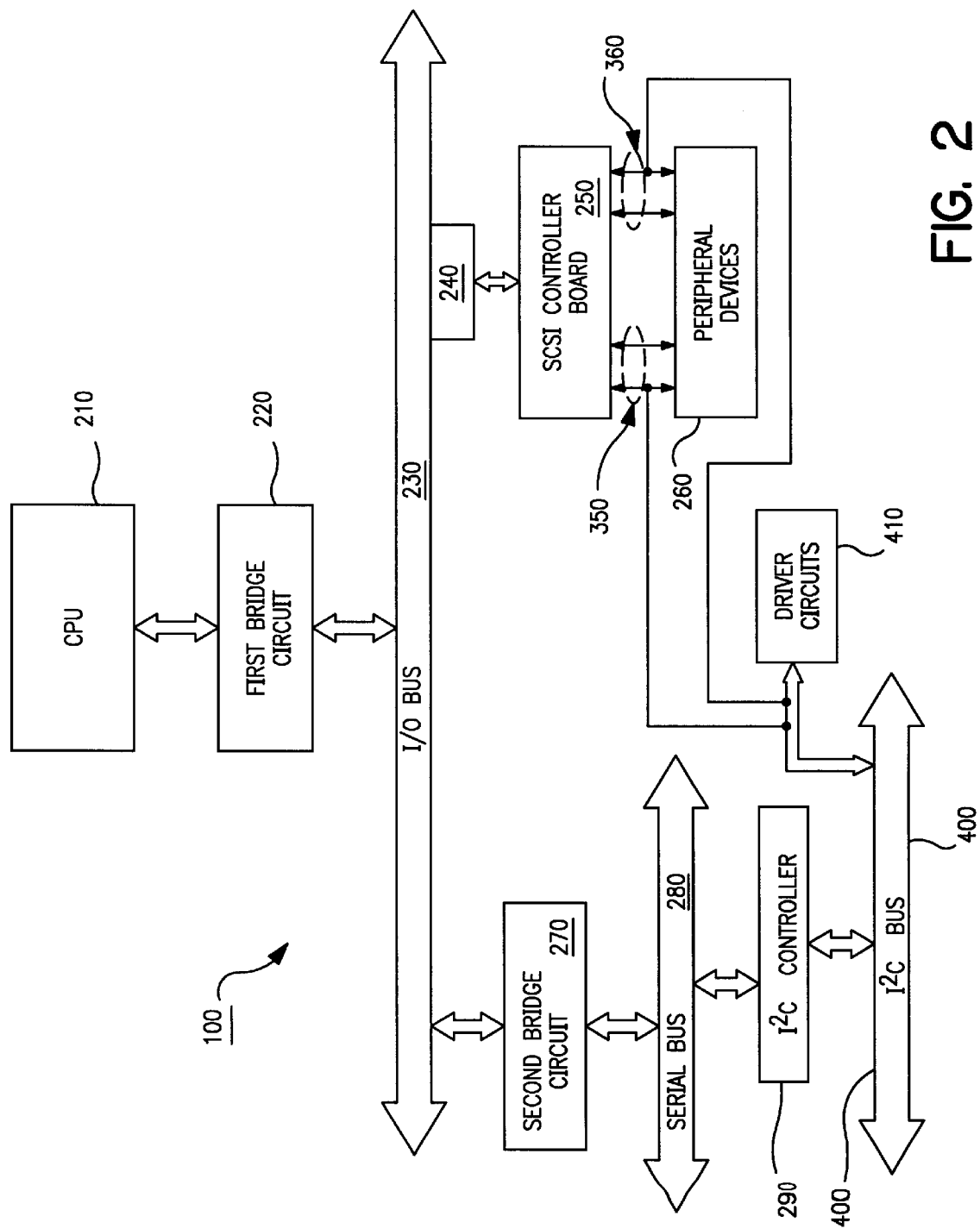
FIG. 2 is an illustrative block diagram of the computer of FIG. 1.

Referring now to FIG. 2, an illustrative block diagram of computer 100 of FIG. 1 is shown. Computer 100 comprises at least one CPU 210 coupled to a first bridge circuit 220. As shown in this embodiment, first bridge circuit 220 is a CPU-to-I/O bridge which couples CPU 210 to an input/output (I/O) bus 230. Examples of I/O bus 230 include a PCI bus, although this example is for illustrative purposes and should not be construed in a restrictive sense. As shown herein, I/O bus 230 is coupled to (i) a SCSI controller board 250 via an I/O connector 240 and (ii) a serial bus 280 through a second bridge circuit 270.

Figure 3:
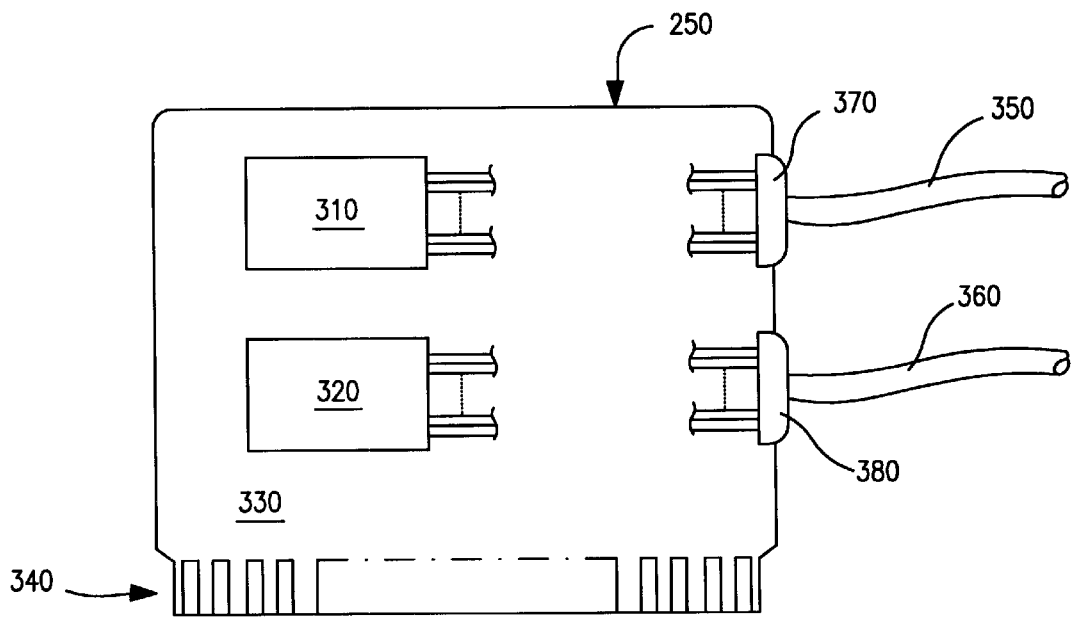
FIG. 3 is an illustrative embodiment of a SCSI controller board implemented within computer of FIGS. 1–2.

Referring now to FIG. 3, an illustrative embodiment of SCSI controller board 250 is shown. SCSI controller board 250 is an optional, removable circuit board that permits expansion of I/O bus 230 associated with main backplane 130 of FIG. 1 in order to support a greater number of peripheral devices. SCSI controller board 250 includes at least two SCSI controllers 310 and 320 which are mounted on a substrate 330 formed from any type of material upon which SCSI controllers 310 and 320 can be attached. Shown with a form factor of a printed circuit board, for example, substrate 330 includes a connector 340 adapted to establish a mechanical and electrical coupling with one of the connectors of main backplane 130. As shown, connector 340 includes any type of connector which mates with connector 140 of main backplane 130 of FIG. 1. In this embodiment, connector 340 includes a standard male edge connector.

As further shown in FIGS. 1–3, in this embodiment, each SCSI controller 310 and 320 is coupled through a corresponding cable 350 and 360 to a predetermined set of hard disk drives. Herein, the specific configuration of cables 350 and 360 is in accordance with standard SCSI specifications, such as an ANSI specification entitled "Information Technology—Small Computer Standard Interface," ANSI Ref. No. X3.131 (hereinafter referred to as a "SCSI cable"). The physical nature of these SCSI cables 350 and 360 includes medium to transfer information from a source to a destination. For example, SCSI cables 350 and 360 may include an optional non-conductive sheath protecting a collection of wires, fiber optics, and the like.

As further shown, each SCSI-cable 350 and 360 include a standard SCSI cable connector placed at each end for coupling SCSI controller board 250 to a peripheral board associated with one of a set of peripheral devices 260 such as, for example, hard disk drives as shown in FIG. 1. These SCSI cable connectors are configured in accordance with the above-mentioned SCSI bus specification.

More specifically, as shown in this embodiment, each SCSI controller 310 and 320 on SCSI controller board 250 is coupled to a standard SCSI cable connector 370 and 380, respectively. SCSI cable connectors 370 and 380 provide an interface for SCSI cables 350 and 360, where each SCSI cable is capable of routing information, in a daisy chained fashion, to a set of four (4) hard disk drives. As shown in FIG. 1, SCSI cables 350 and 360 are fed through a notch 125 in barrier 120 to allow the SCSI controller board 250 in the first compartment 121 to communicate with the set of hard disk drives situated in the second compartment 122.

Referring back to FIG. 2, an I²C controller 290 is coupled to serial bus 280 and to an I²C bus 400. I²C bus 400 is a well-known, two wire bus standard for communication between integrated circuits. The I²C bus 400 is routed to peripheral backplane 160 of FIG. 1 in order to connect to one or more driver circuits 410 which correspond to a group of LEDs physically proximate to their corresponding hard disk drives.

Figure 4:
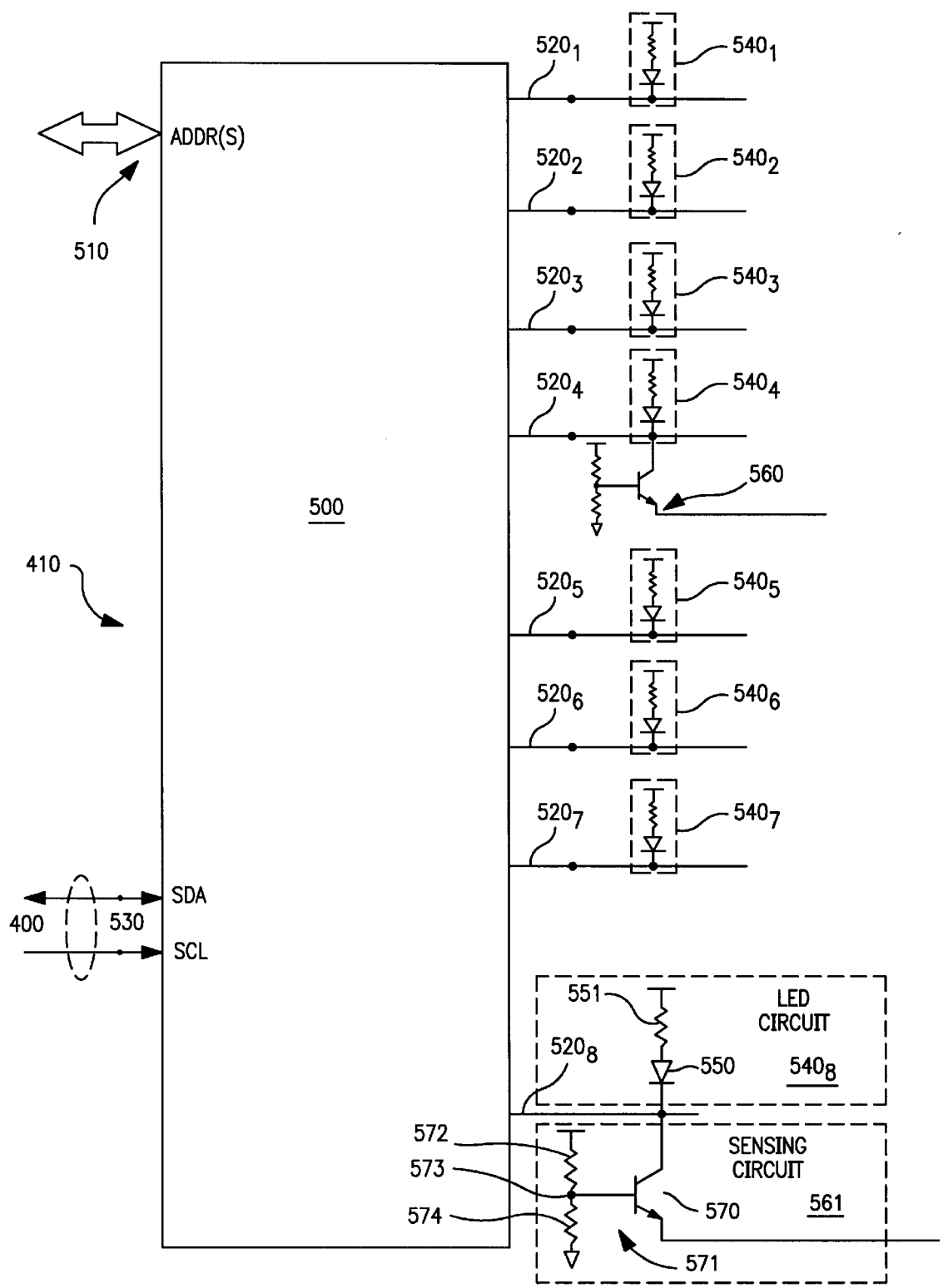
FIG. 4 is an illustrative embodiment of a driver circuit corresponding to a set of disk drives of the computer of FIGS. 1–2.

Referring now to FIG. 4, an illustrative embodiment of a driver circuit 410 of FIG. 2 is shown. Driver circuit 410 includes an I²C circuit 500 such as an Philips® PCF 8574 integrated circuit for example. I²C circuit 500 includes a plurality of I/O ports including an address port 510, I/O data ports $520_1$–$520_m$ ("m" is a positive whole number, m=8 herein) and an I²C bus port 530. In this particular embodiment, one or more address signal lines provide a code to address port 510 to indicate the backplane location of driver circuit 410 because each I²C circuit is assigned an address associated with its physical location in the chassis. I²C bus port 530 is coupled to I²C bus 400 to receive clocking signals and to allow data on certain I/O data ports (e.g., I/O data ports $520_4$ and $520_8$) to be sensed by software executed by the CPU. The software performs mapping of the cable routing within the chassis which is retained through any number of techniques such as tables.

As further shown in FIG. 4, each I/O data port $520_1$–$520_8$ is coupled to an light emitting diode (LED) circuit $540_1$–$540_8$ associated with each peripheral device (e.g., hard disk drive). In this embodiment, each LED circuit (e.g., LED circuit $540_8$) comprises a LED 550 which includes an anode coupled to a pull-up resistor 551 and a cathode coupled to the corresponding I/O signal line $520_8$. The resistance of pull-up resistor 551 is nominal, generally in the range of approximately 220 ohms ($\Omega$). Also, sensing circuits 560 and 561 are further coupled to those I/O data ports associated with each SCSI cable. In this illustrative embodiment, each SCSI cable enables a SCSI controller to control up to four (4) disk drives. Thus, a first sensing circuit 560 is coupled to one set of I/O data ports $520_1$–$520_4$ while a second sensing circuit 561 is coupled to another set of I/O data ports $520_5$–$520_8$. The use of these sensing circuits allow driver circuit 410 to be used as a bi-directional device instead of an unidirectional device controlling the output of the LEDs.

As shown in greater detail, second sensing circuit 561 includes a transistor 570 in which a collector of transistor 570 is coupled to the cathode of LED 550 while the emitter of transistor 570 is coupled to a SCSI_RESET_L signal line of SCSI cable 350. The base of the transistor 570 is coupled to a resistor network 571 including a first resistor 572 coupled between a node 573 and Vcc at a predetermined voltage and a second resistor 574 coupled between node 573 and ground. The voltage at node 573 is fixed.

As a result, when the SCSI_RESET_L signal line is activated by setting the voltage associated with SCSI_RESET_L signal line lower than the fixed voltage at node 573, transistor 570 is turned on. This drives LED 550 to be placed in an ON state to emit light which provides an ability for the end user to visually perceive which hard disk drive is being accessed. More importantly, however, a first voltage on I/O data port $520_8$ may be sensed by standard software, being processed to probe I²C bus port 530 (SDA) of driver circuit 410, to match a controller to a particular peripheral backplane and/or a set of peripheral devices. The first voltage is generally equivalent to the expected voltage at the collector of transistor 570.

Alternatively, when the SCSI_RESET_L signal line is deactivated (the voltage associated with SCSI_RESET_L signal line is higher than the fixed voltage at node 573), transistor 570 is turned off. This places LED 550 in an OFF state to discontinue its illuminance. The increased voltage at I/O data port 520₈ is also sensed by the standard software probing I²C bus port 530 of driver circuit 410 to determine that the selected controller is not coupled to a particular set of peripheral devices.

Figure 5:
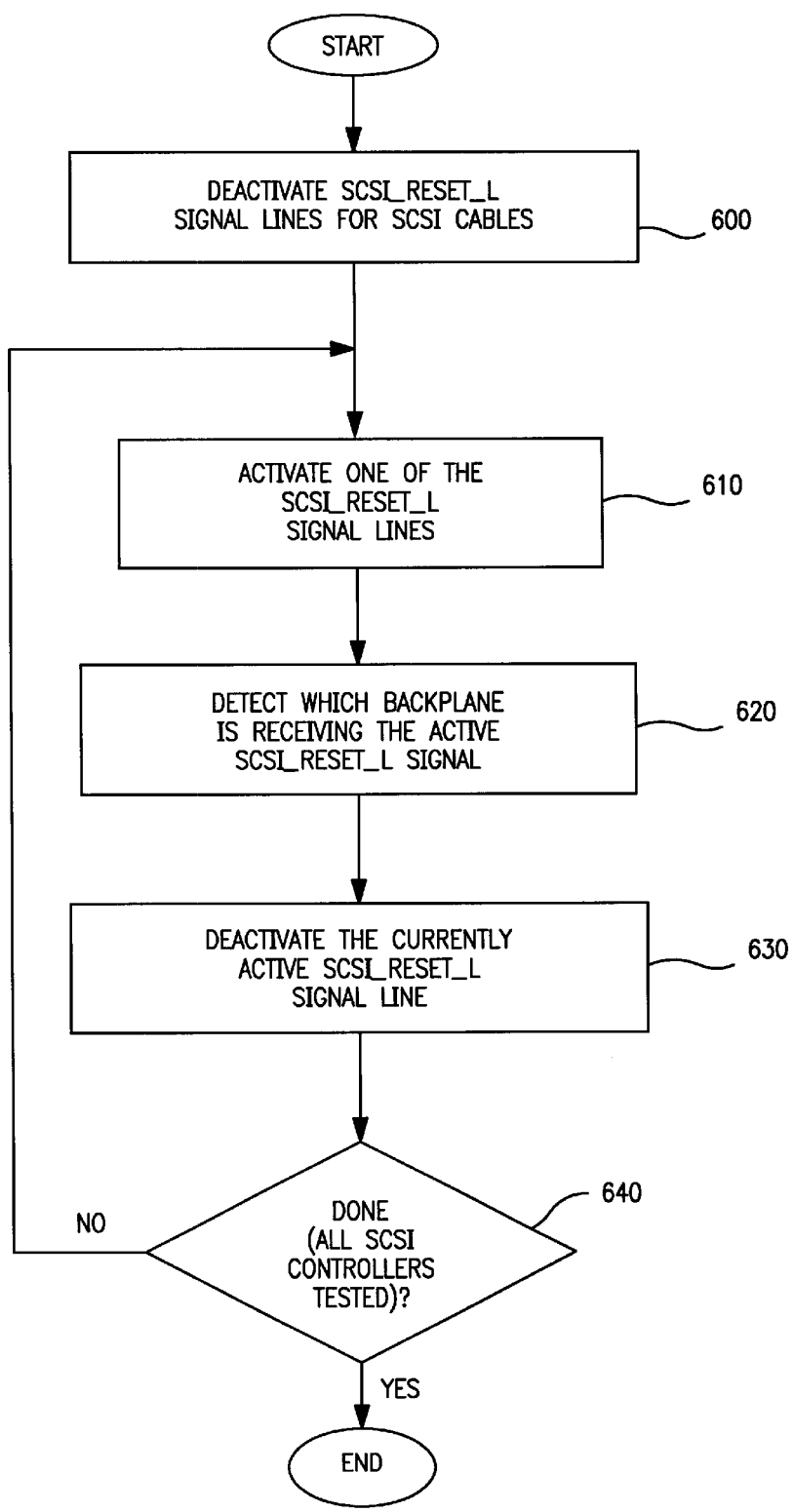
FIG. 5 is an illustrative flowchart setting forth the operations of the driver circuit of FIG. 4.

As described in FIG. 5, an illustrative flowchart of the acts performed by the computer during power-up in order to map various SCSI controllers with peripheral devices is shown. Herein, software executed by CPU 210 of FIG. 2 is responsible for mapping which set of peripheral devices is associated with which SCSI cable. This mapping may be accomplished through (i) successive activation and deactivation of SCSI_RESET_L signal lines for each SCSI cable during initialization of the computer, and (ii) creation of a table to store which backplane is associated with which SCSI cable for example.

In particular, at block 600, software is executed by CPU 210 of FIG. 2 in order to signal each SCSI controller to deactivate the SCSI_RESET_L signal line associated with its SCSI cable. Thereafter, at blocks 610 and 620, a selected SCSI controller is signaled to activate its SCSI_RESET_L signal line while software probes the various sense inputs on the driver circuit, via I²C bus port 530 in this embodiment, to detect which peripheral backplane is receiving the SCSI_RESET_L signal, and thus, which peripheral devices are controlled by that particular SCSI controller. Once the peripheral backplane is detected, software deactivates the SCSI_RESET_L signal line associated with that SCSI controller and proceeds to the next successive SCSI controller until all of the SCSI controllers are tested (blocks 630 and 640). Thereafter, the software has mapped the routing associated with the SCSI cables.

The present invention described herein may be designed in accordance with different circuitry and different acts of operation. While the present invention has been described in terms of an illustrative embodiment, other embodiments may come to mind to those skilled in the art without departing from the spirit and scope of the present invention. The invention should, therefore, be measured in terms of the claims which follows.

What is claimed is:

1. A computer comprising:
   a controller board including an input/output (I/O) bus;
   a first set of disk drives;
   a second set of disk drives;
   a cable coupled to the controller board and one of the first and second set of disk drives, the cable adapted to couple the I/O bus to one of the first and second set of disk drives; and
   an integrated circuit associated with the first set of disk drives, the integrated circuit including
      a plurality of I/O data ports, one set of the plurality of I/O data ports coupled to the first set of disk drives,
      a sensing circuit coupled to the first set of disk drives and coupled to the one set of the plurality of I/O data ports, the sensing circuit sensing whether the first set of disk drives is coupled to the cable, and
      a bus port through which the voltage change is sensed to signal the cable is coupled to the first set of disk drives.

2. The computer of claim 1, wherein the controller board is a Small Computer Standard Interface (SCSI) controller board.

3. The computer of claim 2, wherein the SCSI controller board includes a first SCSI controller and a second SCSI controller.

4. The computer of claim 3, wherein the first set of disk drives include a plurality of hard disk drives.

5. The computer of claim 1, wherein the cable includes a plurality of signal lines arranged in accordance with a standard Small Computer Standard Interface (SCSI) specification.

6. The computer of claim 5, wherein the sensing circuit comprises
   a transistor including a gate, a collector and an emitter, the collector being coupled to the one of the plurality of I/O data ports and the emitter being coupled to a selected signal line of the SCSI cable.

7. The computer of claim 6, wherein the selected signal line is a SCSI Reset line.

8. The computer of claim 1, further comprising a central processing unit executing software to sense the change of voltage on at least the one of the plurality of I/O data ports.

9. The computer of claim 8 further comprising an I²C bus accessible by the central processing unit and coupled to the bus port.

10. A method for determining a routing of a cable between a plurality of first devices and a plurality of second devices within a computer chassis, the method comprising:
    deactivating a selected signal line of the cable;
    sensing a first voltage at the plurality of second devices;
    activating the selected signal line of the cable;
    sensing a second voltage at the plurality of second devices; and
    determining a pairing between the cable and the plurality of second devices.

11. The method of claim 10, wherein at least one of the plurality of first devices includes a Small Computer Standard Interface (SCSI) controller.

12. The method of claim 11, wherein at least one of the second devices includes a hard disk drive.

13. The method of claim 10, wherein the determining of the pairing includes
    determining whether the second voltage is generally equivalent to an expected voltage; and
    concluding that the cable is coupled to the plurality of second devices when the voltage is generally equivalent to the expected voltage.

14. The method of claim 13, wherein the determining of the pairing further includes
    determining whether the second voltage exceeds a threshold voltage; and
    concluding that the cable is not coupled to the plurality of second devices if the voltage exceeds the threshold voltage.

15. The indicator of claim 1, further comprising:
    an LED being coupled to the one of the plurality of I/O data ports.

16. A computer comprising:
    a controller board including an I/O bus and a control circuit to control the I/O bus;
    a first set of peripherals;
    a second set of peripherals;
    an I/O bus cable coupleable to the I/O bus and coupleable to one of the first set of peripherals and the second set of peripherals, the I/O bus cable including an I/O signal line; and,
    a sensing circuit coupled to the first set of peripherals to sense the voltage of the I/O signal line if and only if the first I/O bus cable is coupled to the first set of peripherals.

17. A computer comprising:
    a controller board including a small computer standard interface (SCSI) controller;
    a SCSI cable coupled to one of a first set of peripherals and a second set of peripherals, the SCSI cable including a reset signal line; and, a first sensing circuit coupled to the reset signal line, the first sensing circuit including an indicator and a transistor having a collector of the transistor being coupled to a first input of the indicator and an emitter of the transistor being coupled to the reset signal line.

18. The computer of claim 17, wherein the indicator of the sensing circuit is a light emitting diode.

19. The computer of claim 18, wherein the input of the indicator of the sensing circuit is a cathode.

20. The computer of claim 17, wherein activation of the reset signal line enables visual perception as to whether the first set of peripherals or the second set of peripherals is being accessed.

21. The computer of claim 17, wherein activation of the reset signal line enables software to sense whether the SCSI controller controls the first set of peripherals or the second set of peripherals.

22. A method of mapping the routing of a plurality of small computer standard interface (SCSI) cables routed between a plurality of controllers and both a first peripheral backplane coupled to a first set of peripherals and a second peripheral backplane coupled to a second set of peripherals, comprising:

deactivating reset signal lines for each of the plurality of SCSI cables, each of the reset signal lines being routed to a driver circuit;

activating a first reset signal line of a first SCSI cable of the plurality of SCSI cables;

sensing a bus port at the driver circuit to detect whether the first SCSI cable is coupled to the first peripheral backplane or the second peripheral backplane;

deactivating the first reset signal line of the first SCSI cable.

23. The computer of claim 22 further comprising:

activating a second reset signal line of a second SCSI cable of the plurality of SCSI cables;

sensing the bus port at the driver circuit to detect whether the second SCSI cable is coupled to the first peripheral backplane or the second peripheral backplane;

deactivating the second reset signal line of the second SCSI cable.

24. The computer of claim 22 further comprising:

creating a table to store an association between a plurality of peripheral backplanes including the first peripheral backplane and the second peripheral backplane and the plurality of SCSI cables.

* * * * *